(12) United States Patent
Carmi

(10) Patent No.: US 8,243,874 B2
(45) Date of Patent: Aug. 14, 2012

(54) APPARATUS AND METHOD FOR SPECTRAL COMPUTED TOMOGRAPHY

(75) Inventor: Raz Carmi, Haifa (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 551 days.

(21) Appl. No.: 12/375,794

(22) PCT Filed: Jul. 23, 2007

(86) PCT No.: PCT/US2007/074101
§ 371 (c)(1),
(2), (4) Date: Jan. 30, 2009

(87) PCT Pub. No.: WO2008/021663
PCT Pub. Date: Feb. 21, 2008

(65) Prior Publication Data
US 2010/0020922 A1 Jan. 28, 2010

Related U.S. Application Data

(60) Provisional application No. 60/821,836, filed on Aug. 9, 2006.

(51) Int. Cl.
*A61B 6/03* (2006.01)
(52) U.S. Cl. .............. 378/5; 250/366; 250/367
(58) Field of Classification Search .......... 378/4, 7, 378/19, 5; 250/366–367
See application file for complete search history.

(56) References Cited

U.S. PATENT DOCUMENTS

| | | | |
|---|---|---|---|
| 4,870,667 A | 9/1989 | Brunnett et al. | |
| RE37,536 E * | 2/2002 | Barnes | 250/361 R |
| 6,448,559 B1 * | 9/2002 | Saoudi et al. | 250/367 |
| 6,546,075 B1 | 4/2003 | Chartier et al. | |
| 6,987,833 B2 | 1/2006 | Du et al. | |
| 2005/0173641 A1 * | 8/2005 | Unger et al. | 250/370.09 |
| 2005/0259783 A1 | 11/2005 | Hoffman | |
| 2006/0056581 A1 * | 3/2006 | Hoffman et al. | 378/19 |
| 2006/0067471 A1 | 3/2006 | Hopkins et al. | |
| 2006/0067472 A1 * | 3/2006 | Possin et al. | 378/98.9 |
| 2006/0109951 A1 | 5/2006 | Popescu | |
| 2007/0076848 A1 * | 4/2007 | Walter et al. | 378/98.8 |
| 2007/0098139 A1 * | 5/2007 | Hoffman et al. | 378/19 |
| 2008/0317200 A1 * | 12/2008 | Lecomte et al. | 378/19 |

FOREIGN PATENT DOCUMENTS

| | | |
|---|---|---|
| WO | 2006114715 A2 | 11/2006 |
| WO | 2006114716 A2 | 11/2006 |
| WO | 2006117720 A2 | 11/2006 |
| WO | 2007049168 A2 | 5/2007 |

OTHER PUBLICATIONS

Berard, P., et al.; Novel CT Detector Based on an Inorganic Scintillator Working in Photon-Counting Mode; Proc. of SPIE-Progress in Biomedical Optics and Imaging; vol. 6142; 9 pages, Feb. 12, 2006.

* cited by examiner

*Primary Examiner* — Toan Ton
*Assistant Examiner* — John Corbett

(57) ABSTRACT

A computed tomography system includes a radiation sensitive detector element (100) which provides outputs ($D_L$, $D_H$) indicative of the radiation detected in at least first and second energies or energy ranges. Energy resolving photon counters (26) further classify the detector signals according to their respective energies. Correctors (24) correct the classified signals, and a combiner (30) combines the signals according to a combination function to generate outputs ($E_L$, $E_H$) indicative of radiation detected in at least first and second energies or energy ranges.

18 Claims, 4 Drawing Sheets

APPARATUS AND METHOD FOR SPECTRAL COMPUTED TOMOGRAPHY

CROSS REFERENCE TO RELATED APPLICATIONS

This application claims the benefit of U.S. provisional application Ser. No. 60/821,836 filed Aug. 9, 2006, which is incorporated herein by reference.

The present application relates to the field of spectral computed tomography (CT). It also relates to the detection of x-rays and other radiation where it is desirable to obtain information regarding the energy or energy spectra of the detected radiation. It finds particular application in medical imaging, and also has application in non-destructive testing and analysis, security applications, and other applications where energy discrimination capabilities are useful.

While conventional CT systems have provided image data representative of the x-ray attenuation of an object under examination, such systems have been limited in their ability to provide information about the material composition of the object, especially where different materials have had similar radiation attenuations. Improving the material separation capability of a CT system can, however, be useful in a number of applications. In medical applications, for example, it may be desirable to distinguish between various tissue types, to distinguish tissue from contrast agent, and the like. As another example, information on the composition of a sample can simplify the inspection task in security applications.

Another factor which influences the performance of a CT system is detector efficiency, as the quality of the resultant images is ordinarily a function of the efficiency with which the available x-ray flux is detected and utilized. Viewed from another perspective, improving detector efficiency helps reduce the dose needed to obtain images of a suitable quality.

One way to obtain material composition information is to measure the x-ray attenuation of the object at different x-ray energies or energy ranges, for example by using detectors having spectral capabilities. In one such implementation, detectors have included multiple scintillator layers (or direct conversion layers), with the respective layer selected to have a different energy response. Unfortunately, however, this method tends to have relatively limited energy resolutions and often have partially overlapping spectral responses, thus limiting the energy resolution of the detector output signals.

Another technique for obtaining spectral information is the use of photon counting detectors. Photon counting detectors, which have been used in nuclear medicine applications such as single photon emission computed tomography (SPECT) and positron emission tomography (PET), have included scintillator-based detectors such as those based on lutetium orthosilicate ($Lu_2SiO_5$ or LSO), bismuth germanate (BGO) and sodium iodide (NaI) together with a photodetectors such as photomultiplier tubes (PMTs). Still other scintillator materials such as $Gd_2SiO_5$ (GSO), $LuAlO_3$ (LuAP) and $YAlO_3$ (YAP) are also known. Direct conversion detectors such as cadmium zinc telluride (CZT) have also been used.

As a rule, photon counting detectors have a relatively greater sensitivity than traditional CT detectors. Moreover, photon counting detectors can also be used to obtain information about the energy distribution of the detected radiation, which has been used in SPECT and PET applications for useful purposes such as correcting for the effects of scatter. Unfortunately, however, photon counting detectors are not particularly well-suited for use at the count rates typically encountered in CT applications. In particular, these relatively higher count rates can lead to pulse pileups and other effects which serve, among other things, to limit the detector energy resolution.

Accordingly, there remains room for improvement. In particular, it remains desirable to utilize spectral information available from the radiation sensitive detectors so as to provide an improved energy resolution.

Aspects of the present application address these matters and others.

In accordance with one aspect, an x-ray computed tomography apparatus includes an energy discriminating x-ray measurement system which employs first and second different energy measurement techniques to measure an energy of x-radiation received by a detector. The apparatus also includes a combiner which combines energy measurements generated using the first and second techniques to produce an output indicative of the energy of the received x-radiation.

According to another aspect, a computed tomography method includes using a second energy classification technique to sub-classify radiation classified by a first energy classification technique, combining the sub-classified radiation to generate an output indicative of the energy of radiation received by a radiation sensitive detector, and repeating the steps of using the second technique and combining for each of a plurality of reading times. The first and second energy classification techniques are different.

According to another aspect, an apparatus includes a first energy discriminator which uses a first measurement technique to measure an energy of ionizing radiation received by a radiation sensitive detector, and a combiner which uses the first energy measurement and a second energy measurement obtained using a second, different energy measurement technique to produce, for each a plurality of reading times, a first output indicative of received radiation having a first relatively lower energy level and a second output indicative of received radiation having a second relatively higher energy level.

According to another aspect, an apparatus includes a first ionizing radiation detector sensitive to radiation having a first energy, a second ionizing radiation detector sensitive to radiation having a second energy, a first energy resolving photon counter operatively connected to the first radiation detector, a second energy resolving photon counter operatively connected to the second radiation detector, and a combiner which combines signals from the first and second energy resolving photon counters to generate a first output indicative of radiation having a first relatively lower energy and a second output indicative of radiation having a second relatively higher energy.

Still further aspects of the present invention will be appreciated by those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
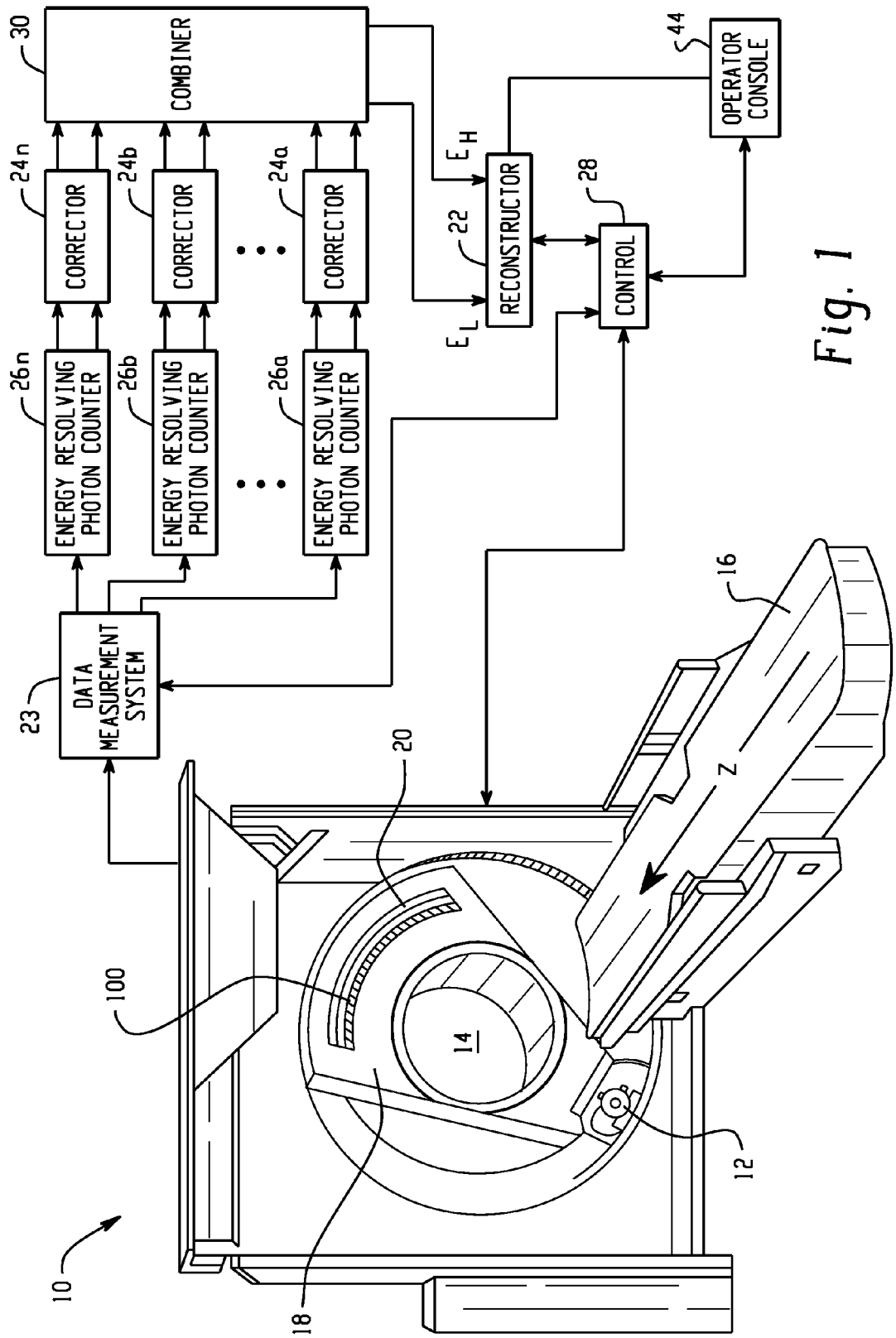
FIG. 1 depicts a CT system.

With reference to FIG. 1, a CT scanner includes a rotating gantry 18 which rotates about an examination region 14. The gantry 18 supports an x-ray source 12 such as an x-ray tube. The gantry 18 also supports an x-ray sensitive detector 20 which subtends an arc on the opposite side of the examination region 14. X-rays produced by the x-ray source 12 traverse the examination region 14 and are detected by the detector 20. Accordingly, the scanner 10 generates projection data indicative of the radiation attenuation along a plurality of projections or rays through an object disposed in the examination region 14.

The detector 20 includes a plurality of detector elements 100 disposed in an arcuate array extending in the transverse and longitudinal directions. As will be described in further detail below, the detector elements 100 and the associated signal processing chain cooperate to measure the energy of the received radiation using at least two (2) different energy measurement mechanisms or techniques. In one implementation, the detectors include at least first and second scintillator layers, with respective photon counting detectors in optical communication with each.

Depending on the configuration of the scanner 10 and the detector 20, the x-ray source 12 generates a generally fan, wedge, or cone shaped radiation beam which is approximately coextensive with the coverage of the detector 20. Moreover, so-called fourth generation scanner configurations in which the detector 20 spans an arc of 360 degrees and remains stationary while the x-ray source 12 rotates about the examination region, flat panel detectors, and single slice detectors may also be implemented. In the case of a multi-dimensional array, the various detector elements 100 may be focused at the x-ray source 12 focal spot and hence form a section of a sphere.

An object support 16 such as a couch supports a patient or other object in the examination region 14. The support 16 is preferably movable in coordination with a scan in order to provide a helical, axial, circle and line, or other desired scanning trajectory.

A data measurement system 23 preferably located on or near the rotating gantry 18 receives signals originating from the various detector elements 100 and provides necessary analog to digital conversion, multiplexing, interface, data communication, and similar functionality. As will again be described in greater detail below, the system also includes a plurality of energy resolving photon counters 26a, 26b . . . 26n, a corresponding plurality of optional correctors 24a, 24b . . . 24n, and a combiner 30 which cooperate to provide outputs $E_L$, $E_H$ indicative of the radiation detected at respective first and second energy ranges or windows.

The outputs $E_L$, $E_H$ are advantageously obtained for each of a plurality of reading periods corresponding to various projection angles about the examination region 14. As will be appreciated by those of ordinary skill in the art, the time period over which a reading is obtained is a function of a number of design considerations, such as the sensitivity of the detectors, the desired transverse resolution, the gantry rotation speed, and the like. A suitable reading period can be on the order of 0.1 to 0.5 milliseconds (ms), although other reading periods can be implemented.

While a single set of such counters 26, correctors 24, and combiners 30 is illustrated, it will be appreciated that counters 26, correctors 24, and combiners 30 are advantageously provided for other detector elements 100 for which similar energy discrimination capabilities are desired.

The reconstructor 22 reconstructs the projection data to generate volumetric data indicative of the interior anatomy of the patient. In addition, the data from the various energy ranges is processed (before reconstruction, after reconstruction, or both) to provide information about the material composition of the object under examination.

A controller 28 coordinates the x-ray source 12 parameters such as tube voltage and current, movement of the patient couch 16, operation of the data measurement system 23, and/or other operating parameters as necessary to carry out a desired scan protocol.

A general purpose computer serves an operator console 44. The console 44 includes a human-readable output device such as a monitor or display and an input device such as a keyboard and/or mouse. Software resident on the console allows the operator to control the operation of the scanner by establishing desired scan protocols, initiating and terminating scans, viewing and otherwise manipulating the volumetric image data, and otherwise interacting with the scanner.

Figure 2:
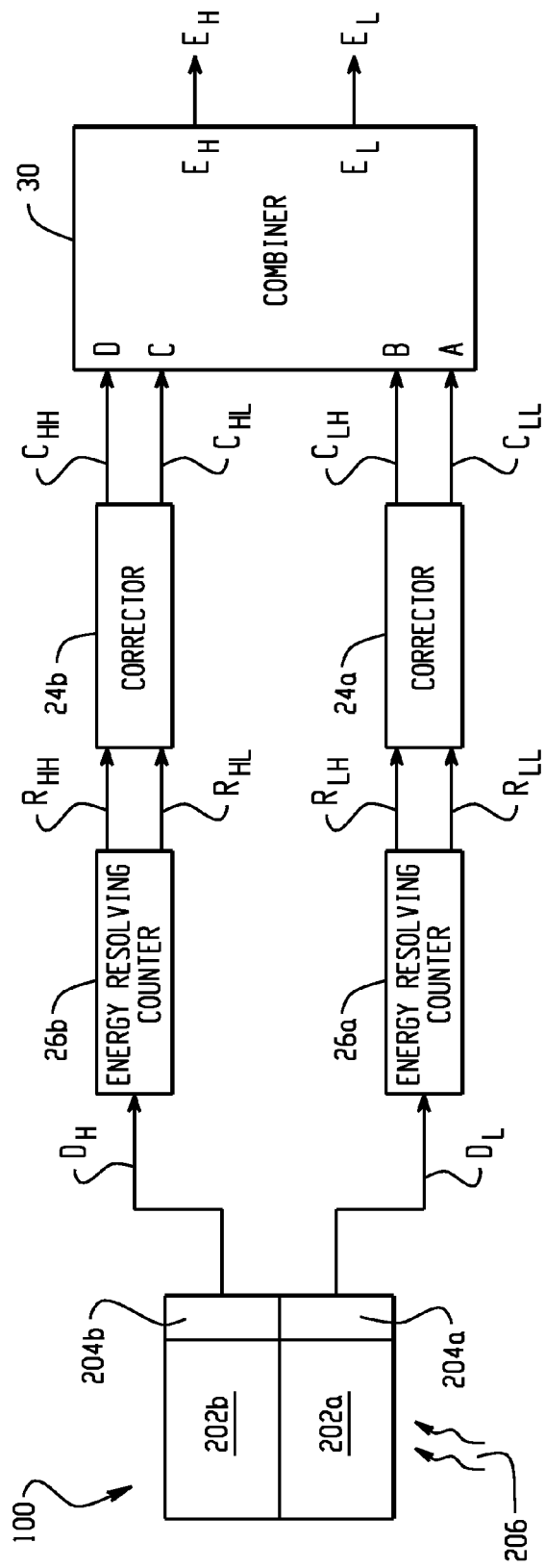
FIG. 2 is a block diagram of an energy discrimination apparatus.

Turning now to FIG. 2, the energy resolving photon counters 26a, 26b, correctors 24a, 24b, and combiner 30 will be described in greater detail in connection with an exemplary detector element 100 having first 202a and second 202b scintillator layers and corresponding first 204a and second 204b optical photon detectors suitable for photon counting methods.

The first scintillator layer 202a, which is closer to the radiation receiving face of the detector 100 and to the x-ray source 12, is fabricated from such material type and thickness which absorbs the softer or lower energy x-radiation 206. The second scintillator layer 202b, is disposed behind the first scintillator 202a relatively farther from the x-ray source 12, and is fabricated from a material type and thickness which absorbs radiation which has passed through the first scintillator 202a, which radiation tends to be harder or higher in energy. One example of such a structure is disclosed in Altman, et al. entitled Double Decker Detector for Spectral CT, U.S. Patent Application Ser. No. 60/674,900, filed on Apr. 26, 2005 and PCT/IB2006/051061, filed on Apr. 10, 2006, which applications are co-pending and commonly owned with the present application and are expressly incorporated by reference in their entirety herein.

A first optical photon detector 204a receives light signals from the first scintillator 202a generates a detector signal $D_L$ indicative of a first relatively lower energy range. A second optical photon detector 204b receives light signals from the second scintillator 202b and generates a detector signal $D_H$ indicative of a second relatively higher energy range. As will be appreciated, the first and second energy ranges are a function of the materials and thicknesses selected for the scintillators 202 and are typically characterized by a limited energy resolution.

In CT applications, the scintillators 202 are advantageously fabricated from relatively fast scintillator materials such as $Lu_2SiO_5$ (LSO), $Lu_{1.8}Y_{0.2}SiO_5$ (LYSO), $Gd_2SiO_5$ (GSO), $LuAlO_3$ (LuAP) or $YAlO_3$ (YAP). These scintillators have rise time constants on the order of 1 nanosecond (ns) and respective decay time constants of approximately 40 ns, 40 ns, 40 ns, 18 ns, and 24 ns. The photon counting detectors are advantageously implemented using photosensors such as photomultiplier tubes, photodiodes, Geiger mode avalanche photodiodes (GM-APDs), silicon photomultipliers (SiPM), or the like.

The energy resolving counters 26 apply photon counting techniques to exploit the energy information provided by the detectors 204. The first energy resolving counter 26a further classifies the relatively lower energy detector signal $D_L$ into first and second energy windows, generating a first output signal $R_{LL}$ indicative of a relatively lower energy range and a second output signal $R_{LH}$ indicative of a higher energy range. The second energy resolving counter 26b likewise further classifies the relatively higher energy detector signal $D_H$ into first and second energy windows, generating a first output signal $R_{HL}$ indicative of a relatively lower energy range and a second output signal $R_{HH}$ indicative of a relatively higher energy range. Consequently, the apparatus employs two distinct energy separation mechanisms: a first mechanism which exploits the energy ranges of the respective scintillator and a second mechanism which exploits the energy resolving capabilities of the photon counting detectors.

Figure 3:
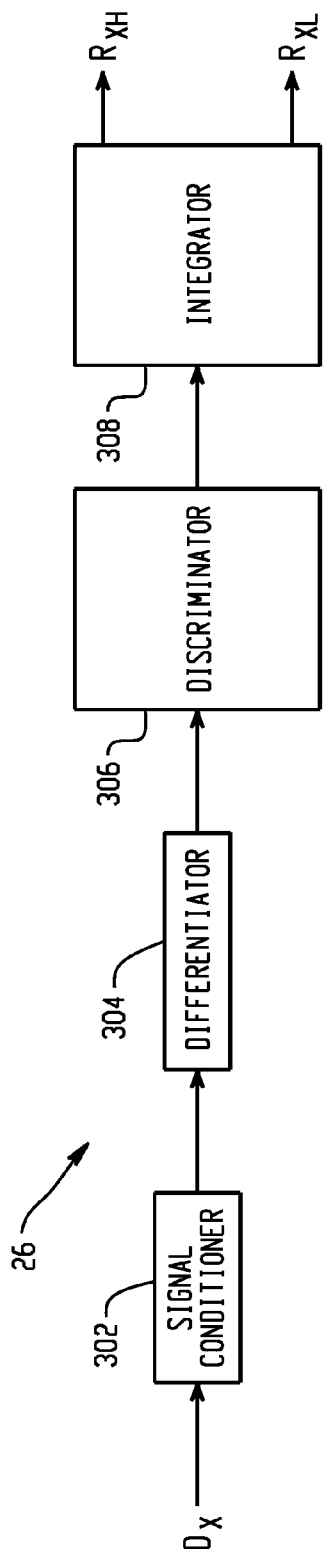
FIG. 3 depicts an energy resolving counter.

Turning briefly to FIG. 3, one technique for implementing the photon resolving counters 26 relies on the rate of change of the detector signals $D_X$ to estimate the energy of the detected radiation. More particularly, the photon resolving counters 26 include a signal conditioner 302 which filters or otherwise conditions the signals $D_X$ from a detector, a differentiator 304 whose output value varies as a function of the rise time and the amplitude of the conditioned signals, a discriminator 306 which classifies the detected photons into two or more energy ranges or windows, and a counter or integrator 308 which produces output signals $R_{XL}$ and $R_{XH}$ indicative of the number and energy of the detected x-ray photons.

Returning now to FIG. 2, optional correctors 24 correct for the effects of pileups on the signals $R_{XL}$ and $R_{XH}$ from the counter 26. More particularly, the correctors 24 weight the signals $R_{XL}$ and $R_{XH}$ as function of the count rate to account for high count rate situations in which the counter 26 is relatively more likely to incorrectly classify the detector signals $D_X$ into a higher energy window.

Such energy resolving photon counters 26 and correctors 24 are described more fully in Carmi, Dual Energy Window X-ray CT with Photon Counting Detectors, U.S. patent application Ser. No. 60/596,894 filed Oct. 28, 2005, which application is co-pending and commonly owned with the present application and is expressly incorporated by reference herein. One advantage of the described photon counting technique is that it is particularly well suited to CT and other relatively high count rate applications.

The combiner 30 combines the signals $C_{LL}, C_{LH}, C_{HL}, C_{HH}$ from the correctors 24a, 24b to generate output signals $E_H, E_L$ indicative of the number of photons detected in respective higher and lower energy ranges or windows. As illustrated, the combiner includes four inputs A, B, C, and D as described in Table 1:

TABLE 1

| Input | Description |
| --- | --- |
| A | Both the first (e.g., scintillator) and second (e.g., photon counting) energy discrimination mechanisms classify the event as belonging to a lower energy window. |
| B | The first energy discrimination mechanism classifies the event as belonging to a lower energy window while the second energy discrimination mechanism classifies the event as belonging to a higher energy window. |
| C | The first energy discrimination mechanism classifies the event as belonging to a higher energy window while the second energy discrimination mechanism classifies the event as belonging to a lower energy window. |
| D | Both the first (e.g., scintillator) and second (e.g., photon counting) energy discrimination mechanisms classify the event as belonging to a higher energy window. |

In situation A, it can reasonably be expected that the event falls within the lower output energy window. In situation D, it can likewise reasonably be expected that the event falls within the higher output energy window. In situations B and C, however, the situation is less clear.

Consequently, the combiner 30 combines the input signals A, B, C, and D to produce output signals $E_L$ and $E_H$ indicative of the radiation detected at respective higher and lower energy windows. In one implementation, the input signals are linearly weighted to produce output signals according to the weighting functions:

$$E_L = A + (1-W_1) \cdot B + W_2 \cdot C \quad \text{Equation 1}$$

and $$E_H = D + (1-W_2) \cdot C + W_1 \cdot B \quad \text{Equation 2}$$

As preserving the total number of counts facilitates reconstruction a standard CT image of the complete x-ray spectrum, the total counts are preserved so that:

$$A + B + C + D = E_L + E_H \quad \text{Equation 3}$$

These above combination functions are presented in tabular form in Table 2:

TABLE 2

|  | Output $E_L$ | Output $E_H$ |
| --- | --- | --- |
| Input A | 1 | 0 |
| Input B | $1 - W_1$ | $W_1$ |
| Input C | $W_2$ | $1 - W_2$ |
| Input D | 0 | 1 |

The correction functions may be empirically derived based on the operational characteristics of a given system. Where the first and second discrimination mechanisms have an equal probability of accurately classifying an event, then the weighting factor would ordinarily be established as $$W_1 = W_2 = 0.5 \quad \text{Equation 4}$$

(assuming that the weighting functions are equal).

Where the first and second discrimination mechanisms have an unequal probability of accurately classifying an event, the optimal weighting factor tends to be on the side of the discrimination method with the higher accuracy. To illustrate to foregoing principle, assume that it is determined through testing that the first discrimination mechanism has a correct classification probability of 0.7 and the second discrimination mechanism has a correct classification probability of 0.75. In such a system, the weighting parameters $W_1$ and $W_2$ are advantageously established as grater then 0.5 (e.g. 0.58) where the exact value can be determined empirically, for example through a calibration process. (again assuming equal values). In this case, input B will contribute to $E_L$ less than its contribution to $E_H$. Input C will contribute to $E_L$ more than its contribution to $E_H$.

Other combination functions which do not preserve the total number of counts, as well as piecewise non-linear and analytically-based weighting functions, are also contemplated. The combinations functions may also be implemented using lookup table or otherwise.

Figure 4:
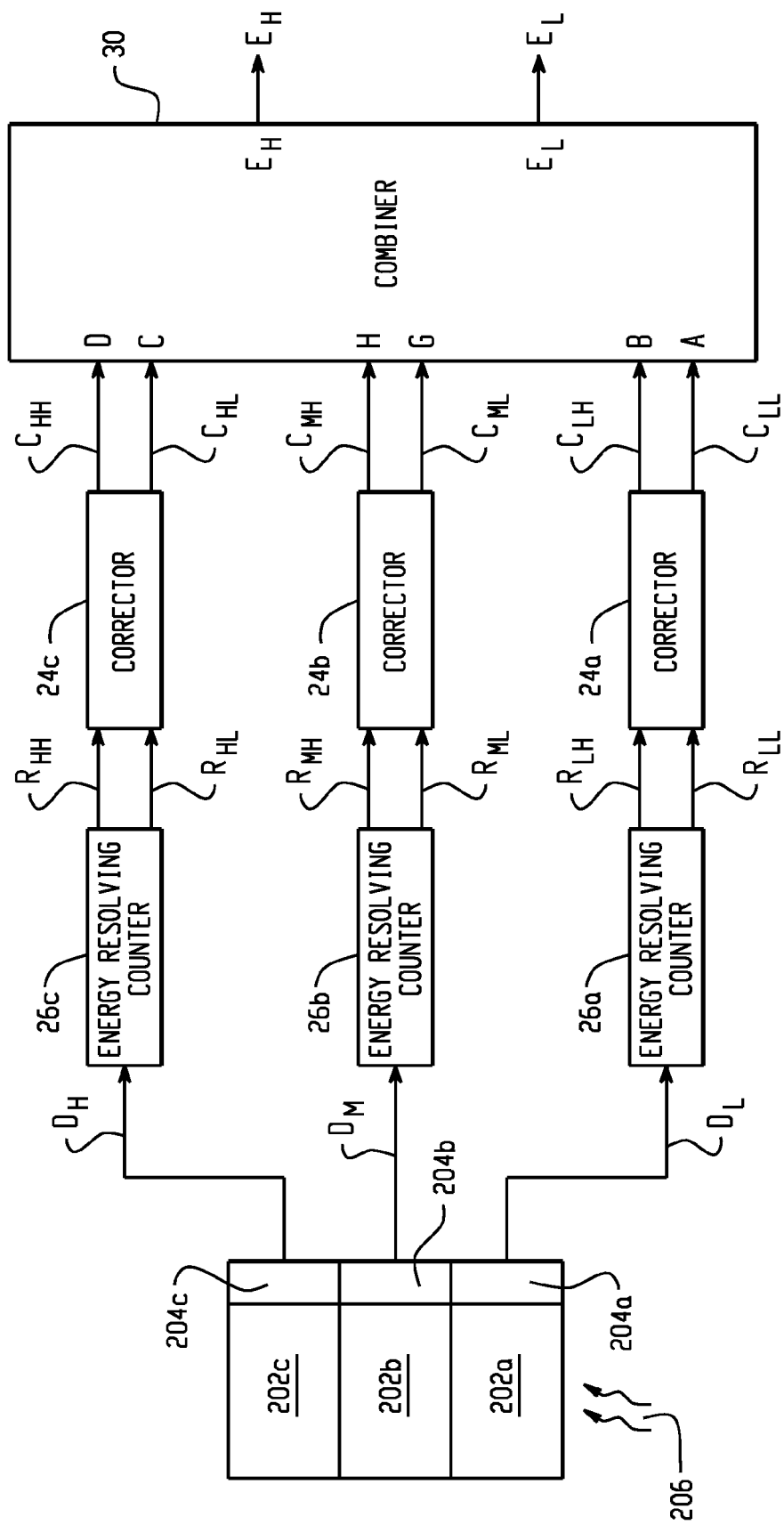
FIG. 4 is a block diagram of an energy discrimination apparatus.

Still other variations are contemplated. For example, the above-described techniques may also be used in connection with detectors 100 having three (3) or more energy outputs. Such a system is illustrated in FIG. 4 for the case of an exemplary detector 100 having three (3) energy levels. A suitable combination function is shown in Table 3:

TABLE 3

|  | Output $E_L$ | Output $E_H$ |
| --- | --- | --- |
| Input A | 1 | 0 |
| Input B | $1 - W_1$ | $W_1$ |
| Input G | $W_3$ | $1 - W_3$ |
| Input H | $1 - W_4$ | $W_4$ |

TABLE 3-continued

|  | Output $E_L$ | Output $E_H$ |
|---|---|---|
| Input C | $W_2$ | $1 - W_2$ |
| Input D | 0 | 1 |

The above principles may also be extended to systems which provide outputs indicative of three (3) or more energy windows.

Other detector 100 configurations are contemplated. For example, the scintillators need not be stacked in relation to the x-ray source 12 as shown generally in FIGS. 2 and 4 and may detect radiation which has traversed different paths. Moreover, the photodetectors 204 need not be located laterally of the x-ray 206 direction. Semiconductor or other direct conversion detectors which produce the requisition information may also be used.

While one advantage of the multiple radiation detection layers 202 (whether they are scintillators or direct conversion materials) is that the count rate of the various signals $D_X$ is relatively reduced, other energy discrimination techniques may also be used. Thus, energy discrimination mechanisms other than the use of multiple detection layers and pulse counting are also contemplated. For example, the known energy resolving method of a single relatively thick layer of scintillator (or direct conversion material) with the additional apparatus that can measure the depth of interaction of each event inside the material and accordingly estimates the energy of the x-ray photon. The described techniques are also applicable to the measurement of x-radiation in other than CT applications and also to the measurement of radiation other than x-radiation.

The photon counters 26, the correctors 24, and combiner 30 may be implemented in hardware or software. The correctors 24 and combiner 30 may also be implemented by the reconstructor 22, as part of the data measurement system 23, or otherwise. Where the various functions are implemented via software, instructions which cause a computer processor to carry out the described techniques are advantageously stored on a computer readable storage medium accessible to the processor.

Figure 5:
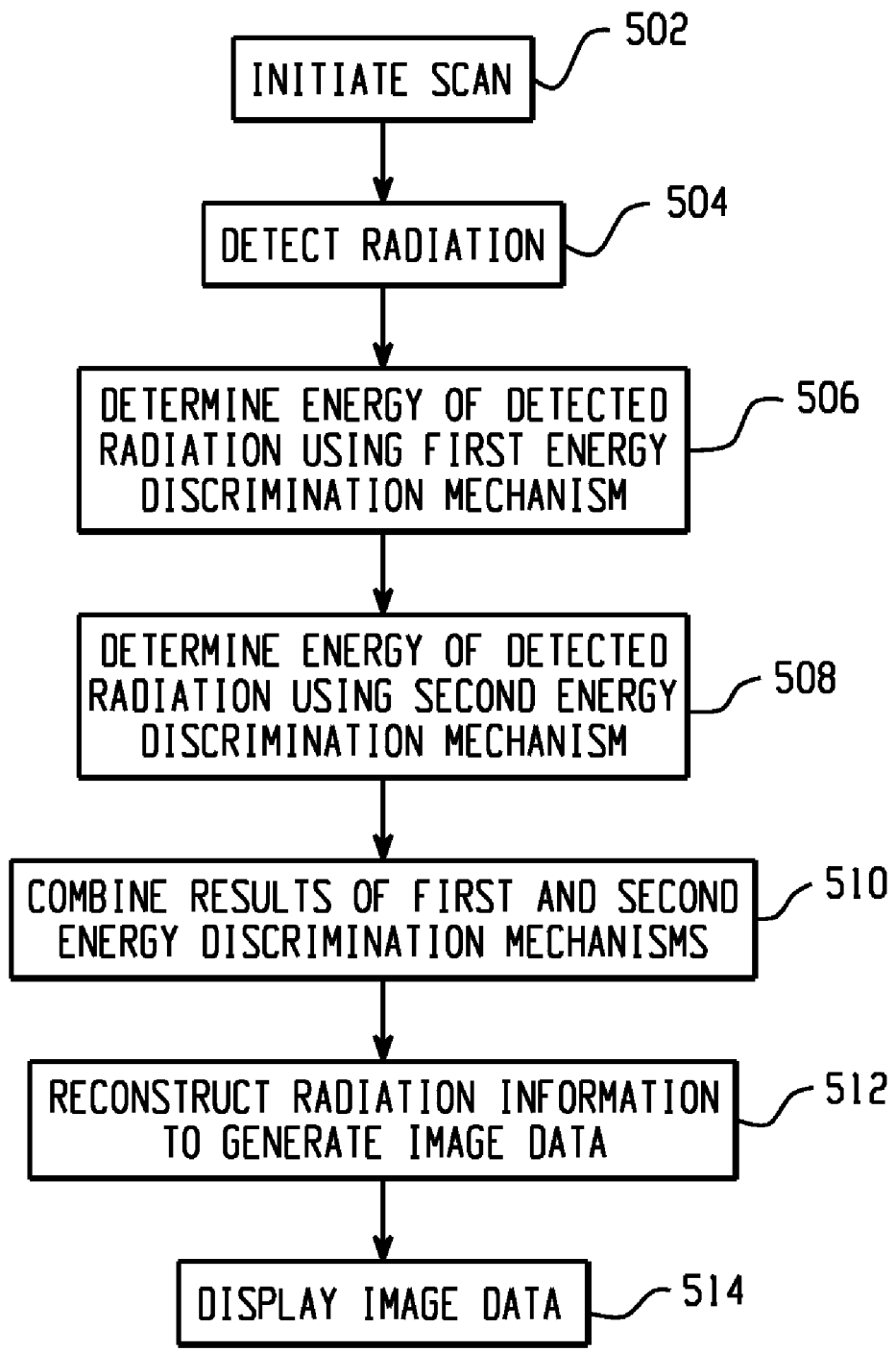
FIG. 5 depicts an imaging method.

Operation will now be described in relation FIG. 5 for the exemplary embodiment of FIGS. 1 and 2.

A scan is initiated at 502.

Radiation which has traversed the examination region 14 is detected at 504.

At 506, a first energy discrimination mechanism is used to determine the energy of detected radiation. As illustrated in FIG. 2, for example, first 202a and second scintillators 202b provide outputs indicative of the radiation detected at first and second energy ranges. Depending on the choice of scintillators, the energy ranges may be at least partially overlapping.

At 508, a second energy discrimination mechanism is used to determine the energy of detected radiation. Again in relation to the example of FIG. 2, a photon counting technique is used to further classify the radiation into two or more energy ranges.

At 510, the results of first and second energy discriminations are combined to generate outputs indicative of the radiation detected at first energies or energy windows using a desired combination function. Note that such outputs are provided for each of a plurality of reading periods indicative of various projection angles about the examination region 14. It should also be noted that the energy separation of the combined mechanisms is ordinarily superior to that which would be obtained by either mechanism operating independently.

While the foregoing steps have been discussed from the perspective of a an detector element 100, it will of course be appreciated that similar steps are performed in connection with other detector elements 100 that are provided with similar energy discrimination capabilities.

At 512, radiation information obtained at a plurality of projection angles is reconstructed to generate image data indicative of the radiation detected in the one or more energy ranges. The signals from two or more energy ranges may also be combined to generate image data indicative of the combined energy ranges.

At 514, the image data is presented in a human readable form, for example on a monitor associated with the operator console 44.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An x-ray computed tomography apparatus comprising:
    a scintillator-based x-radiation sensitive detector that includes a first scintillator layer sensitive to x-radiation having a first energy, a second scintillator layer sensitive to x-radiation having a second energy which is different from the first energy;
    a first energy resolving photon counter in operative communication with the first scintillator layer, wherein the first energy resolving photon counter classifies the x-radiation having a first energy into a first or second energy range, and generates a first or a second signal corresponding to the first or the second energy range of the x-radiation, wherein the second energy range is higher than the first energy range;
    a second energy resolving photon counter in operative communication with the second scintillator layer, wherein the second energy resolving photon counter classifies the x-radiation having a second energy into a third or fourth energy range, and generates a third or a fourth signal corresponding to the third or the fourth energy range of the x-radiation; and
    a combiner that combines the signals generated by the first and the second energy resolving photon counters to generate output signals that indicate the number of photons detected.

2. The apparatus of claim 1, wherein the energy resolving photon counter includes a differentiator which generates a signal indicative of a rate of change of a signal from the first photon counting detector.

3. The apparatus of claim 1 wherein the combiner combines the measurements according to a piecewise linear combination function.

4. The apparatus of claim 3 wherein the combination function includes

|  | Output $E_L$ | Output $E_H$ |
|---|---|---|
| Input A | 1 | 0 |
| Input B | $1 - W_1$ | $W_1$ |

-continued

|         | Output $E_L$ | Output $E_H$ |
|---------|--------------|--------------|
| Input C | $W_2$        | $1 - W_2$    |
| Input D | 0            | 1            | where inputs A, B, C, and D are inputs of the combination function, Outputs $E_L$ and $E_H$ are outputs of the combination function, and $W_1$ and $W_2$ are weighting functions.

5. The apparatus of claim 1 wherein the combiner generates an output indicative of the energy and intensity of the received x-radiation for each of a plurality of projections and the apparatus further includes a reconstructor which uses the output of the combiner to generate volumetric data representative of the received radiation.

6. A computed tomography method comprising:
  using a second energy classification technique to sub-classify radiation classified by a first energy classification technique, wherein the first and second energy classification techniques are used to classify the radiation as a function of its energy and the first and second energy classification techniques are different;
  combining the sub-classified radiation to generate an output indicative of the energy of radiation received by a scintillator-based radiation sensitive detector;
  repeating the steps of using the second technique and combining for each of a plurality of reading times.

7. The computed tomography method of claim 6 wherein the method includes using the first energy classification technique to classify the received radiation as a function of its energy.

8. The method of claim 6 wherein using a first technique includes using at least first and second scintillators to classify the received radiation.

9. The method of claim 6 wherein using a second technique includes using an energy resolving photon counter.

10. The method of claim 9 wherein the method includes correcting for pulse pileups.

11. The method of claim 6 wherein the received radiation is classified into at least four sub-classes ($R_{LL}$, $R_{LH}$, $R_{HL}$, $R_{HH}$), and the combiner generates outputs indicative of radiation received in a relatively higher and a relatively lower energy range.

12. The method of claim 6 including reconstructing radiation received at a plurality of projection angles to generate volumetric data indicative of an object under examination.

13. An apparatus comprising:
  a first energy discriminator which uses a first measurement technique to measure an energy of ionizing radiation received by a scintillator-based radiation sensitive detector;
  a combiner which uses the first energy measurement and second energy measurement obtained using a second, different energy measurement technique to produce, for each a plurality of reading times, a first output indicative of received radiation having a first relatively lower energy level and a second output indicative of received radiation having a second relatively higher energy level.

14. The apparatus of claim 13 wherein the first energy discriminator includes an energy resolving photon counter.

15. An apparatus comprising;
  a first scintillator-based ionizing radiation detector sensitive to radiation having a first energy;
  a second scintillator-based ionizing radiation detector sensitive to radiation having a second energy;
  a first energy resolving photon counter operatively connected to the first radiation detector;
  a second energy resolving photon counter operatively connected to the second radiation detector;
  a combiner which combines signals from the first and second energy resolving photon counters to generate a first output indicative of radiation having a first relatively lower energy and a second output indicative of radiation having a second relatively higher energy.

16. The apparatus of claim 15 wherein the first radiation detector includes a first scintillator and the second radiation detector includes a second scintillator.

17. The apparatus of claim 15 including a pulse pileup corrector operatively connected to an output of the first energy resolving photon counter.

18. The method of claim 6 wherein using a second technique includes using a photon counting detector.

\* \* \* \* \*